United States Patent [19]

DeBalko et al.

[11] Patent Number: 5,175,662
[45] Date of Patent: Dec. 29, 1992

[54] DEVICE INCLUDING AN MTU AND PROTECTOR

[75] Inventors: George A. DeBalko, Washington Twp., Morris County; Rajendra S. Rana, Franklin Twp., Somerset County; Warren J. Rhines, Morris Twp., Morris County, all of N.J.

[73] Assignee: AT&T Bell Laboratories, Murray Hill, N.J.

[21] Appl. No.: 752,712

[22] Filed: Aug. 30, 1991

[51] Int. Cl.⁵ .............................................. H02H 3/22
[52] U.S. Cl. .................................. 361/119; 361/127; 379/412
[58] Field of Search ............... 361/119, 120, 129, 117, 361/127; 337/28, 29, 31, 32; 379/331, 412

[56] References Cited

U.S. PATENT DOCUMENTS

| | | | |
|---|---|---|---|
| 4,220,833 | 9/1980 | Wert et al. | 179/175.31 |
| 4,262,317 | 4/1981 | Baumbach | 361/124 |
| 4,373,121 | 2/1983 | Sartori et al. | 179/175.3 F |
| 4,396,809 | 8/1983 | Brunssen | 179/175.3 F |
| 4,529,847 | 7/1985 | DeBalko | 179/175.3 F |
| 4,758,921 | 7/1988 | Hung | 361/119 |
| 4,796,150 | 1/1989 | Dickey et al. | 361/119 |
| 4,827,504 | 5/1989 | Collins et al. | 379/399 |
| 4,876,621 | 10/1989 | Ruat et al. | 361/58 |

Primary Examiner—Todd E. DeBoer
Attorney, Agent, or Firm—L. H. Birnbaum

[57] ABSTRACT

Disclosed is a device which includes a Maintenance Termination Unit (MTU) and surge protector in a single 5-pin package. In accordance with one embodiment, a base includes an array of spring contacts, including a grounding element, in which are inserted both a surge protector module and an edge of a circuit board including the MTU.

14 Claims, 4 Drawing Sheets

DEVICE INCLUDING AN MTU AND PROTECTOR

BACKGROUND OF THE INVENTION

This invention relates to telecommunications equipment.

Maintenance Termination Units (MTUs) are utilized in telecommunications equipment to disconnect the end customer from the network in order to determine if any problems are on the customer side or network side of the equipment (see, e.g., U.S. Pat. No. 4,396,809 issued to Brunssen). Solid state protectors are used to short incoming signals to ground when excess voltage or current appears on the line (see, e.g., U.S. Pat. No. 4,796,150 issued to Dickey et al). Heretofore, the MTU and protector typically were mounted in separate positions within an enclosure on the side of the customer's home (see, e.g., U.S. Pat. No. 4,827,504 issued to Collins et al).

In order to reduce the overall size and cost of telecommunications equipment mounted at or near the customer's house, it is desirable to combine both the MTU and protector into a single package.

SUMMARY OF THE INVENTION

The invention is a device comprising a base member including a plurality of electrical contacts, each contact being electrically coupled to a corresponding pin projecting from the base. The device also comprises a circuit board including a maintenance termination unit mounted thereon and contact pads near an edge of the board. The device further comprises a surge protector module in close proximity to the board and also including contact pads thereon. The board and module are mounted within the electrical contacts to hold the board and module in place and to provide electrical contact between the contact pads and the pins.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

Figure 1:
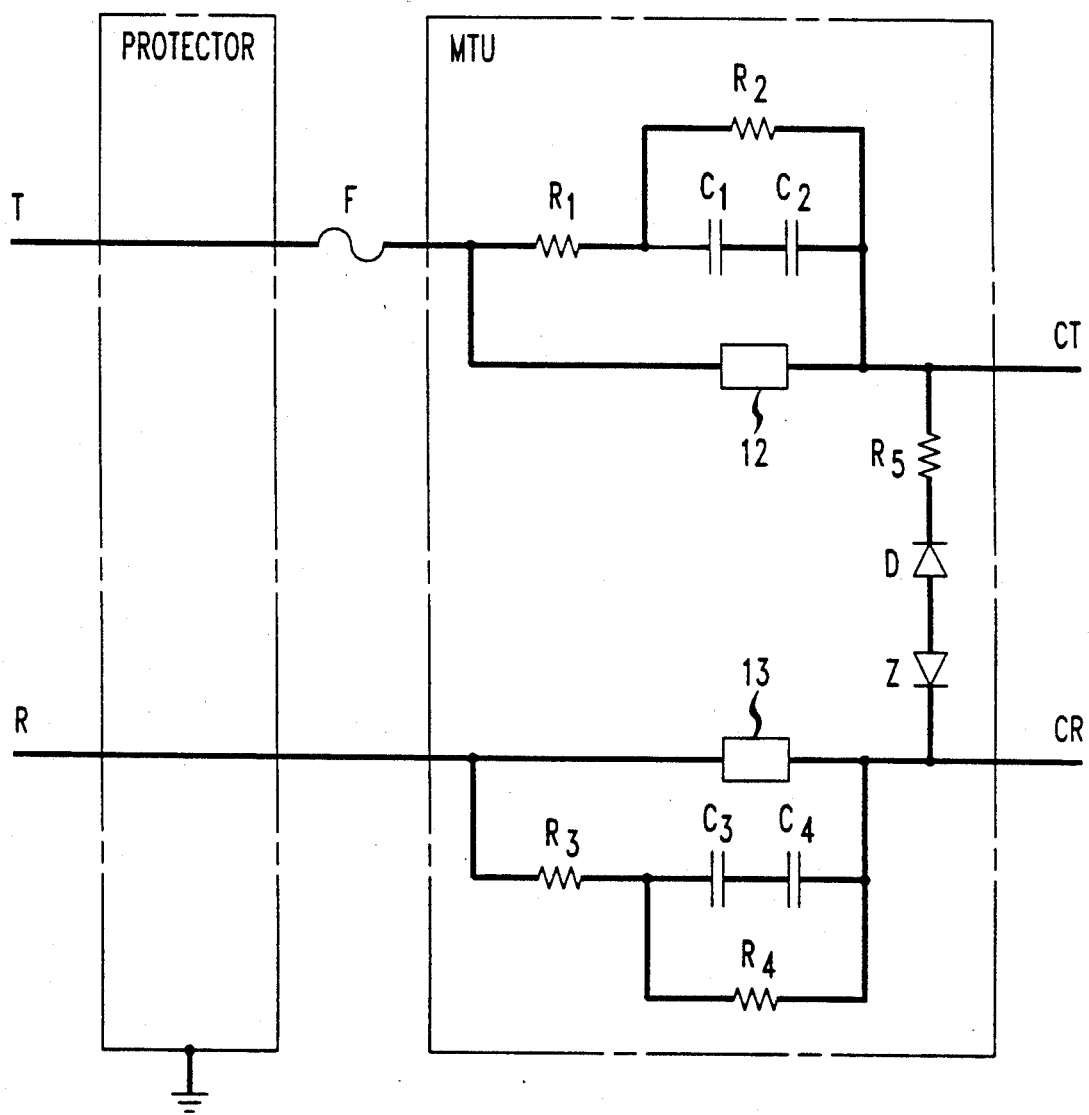
FIG. 1 is a schematic circuit diagram of an MTU and protector in accordance with the invention.

A combined MTU and protector are shown in the schematic illustration of FIG. 1. Telephone communications are provided to the customer from a central office (not shown) through a pair of conductors designated T (for Tip) and R (for Ring). A surge protector module is coupled between the T and R conductors and ground. The module is illustrated as a box 10, and can include solid state, gas tube or carbon block devices. During normal operation, the module will act as an open circuit to any signals on the T and R conductors. However, if the voltage or current on the conductors should reach a threshold value, for example, due to a lightning strike or an induced current from nearby power lines, the module components will become conducting and short the signals to a ground connection.

It will be appreciated that the surge protector module shown is intended to be a generalization of typical modules available in the commercial market. One particular example, which is described in more detail later and in U.S. Pat. No. 4,796,150 issued to Dickey et al, includes a solid state surge arrestor and a plurality of steering diodes. The surge arrestor itself is a single chip including a silicon controlled rectifier and a zener diode.

Conductor T is coupled through a fuse F to the MTU. The MTU includes a pair of semiconductor chips, one (12) coupled in series with conductor T and the other (13) coupled in series with conductor R. Each chip includes a bilateral switch, such as a triac, and appropriate steering diodes, transistors, zener diodes and resistors for biasing the switch. (For more details on the components of an MTU, see, e.g., U.S. Pat. No. 4,396,809 issued to Brunssen.) Resistors $R_1$, $R_2$ and capacitors $C_1$, $C_2$ provide the appropriate gate current to the triac in chip 12, among other functions. Resistors $R_3$, $R_4$ and capacitors $C_3$, $C_4$ provide a similar function for the triac in chip 13.

The chips 12 and 13 are coupled to the conductors, CT and CR, which are coupled to the customer's phone. Coupled between conductors CT and CR, on the customer side of switches 12 and 13, is a distinctive termination comprising a series connection of a resistor $R_5$, a diode, D, and zener diode, Z, which diodes are oppositely disposed. This termination provides a unique signature indicating to the central office that an MTU is installed (see U.S. Pat. No. 4,529,847 issued to De-Balko). During normal operation, the voltage on conductors T and R is sufficient to close the normally open switches 12 and 13 in order to connect the customer on conductors CT and CR. If a fault is detected, the central office can apply a dc voltage which is insufficient to close the switches and thereby disconnect the customer. If the fault persists, the defect is in the network rather than in the customer premises equipment.

Figure 2:
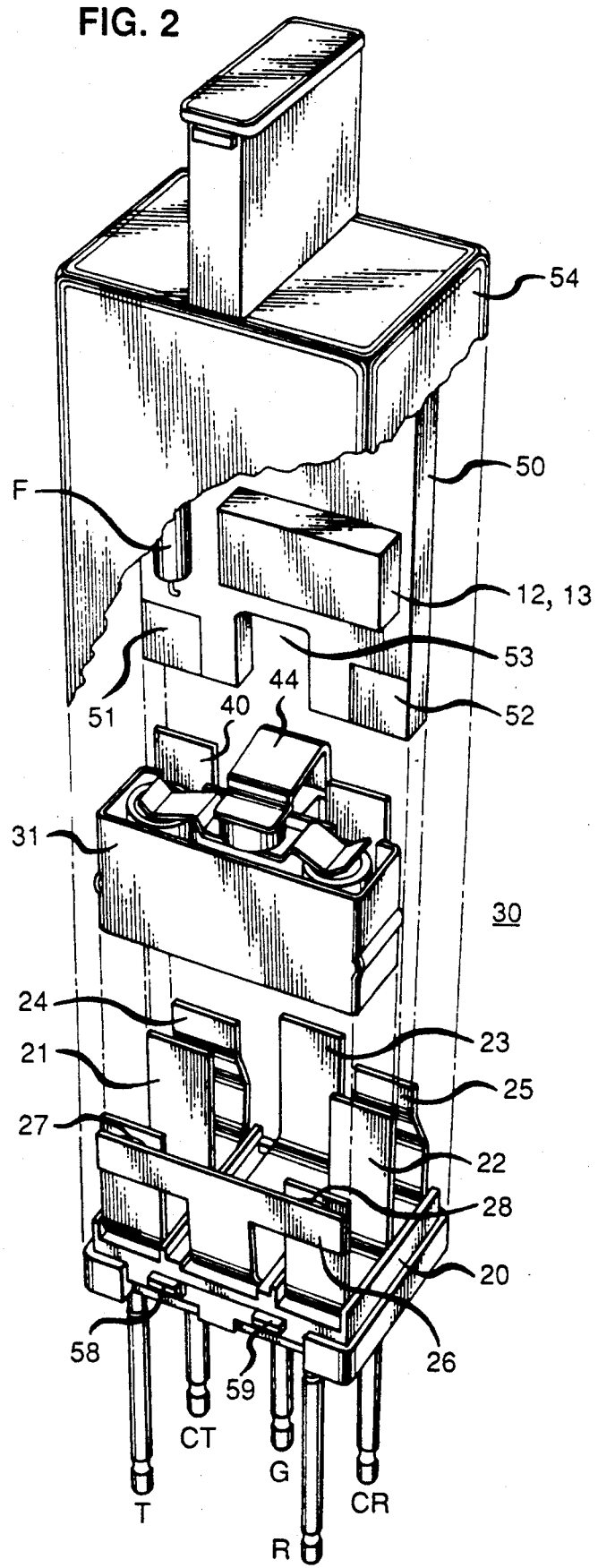
FIG. 2 is an exploded perspective view of a device in accordance with an embodiment of the invention.

FIG. 2 illustrates one embodiment where the protector and MTU are combined in a single package. The package includes a base member, 20, of an insulating material with a plurality of conductive pins extending from the bottom of the base. The pins, typically five in number, are designated T, R, CT, CR and G to correspond to the conductors illustrated in FIG. 1. Pins T and R are coupled through the base to the U-shaped spring contacts 21 and 22, respectively, mounted on the top surface of the base. Pin G is coupled through the base to a U-shaped spring contact 23 which is situated between springs 21 and 22 on the top surface of the base and extends the full width of the base member. Pins CT and CR are coupled through the base to L-shaped spring contacts, 24 and 25, respectively, mounted in the top surface of the base. The spring contacts, 24 and 25, are located behind the spring contacts 21 and 22, respectively, and essentially parallel therewith. The spring contacts are typically mechanically attached to the pins which are inserted through the base member.

Figure 3:
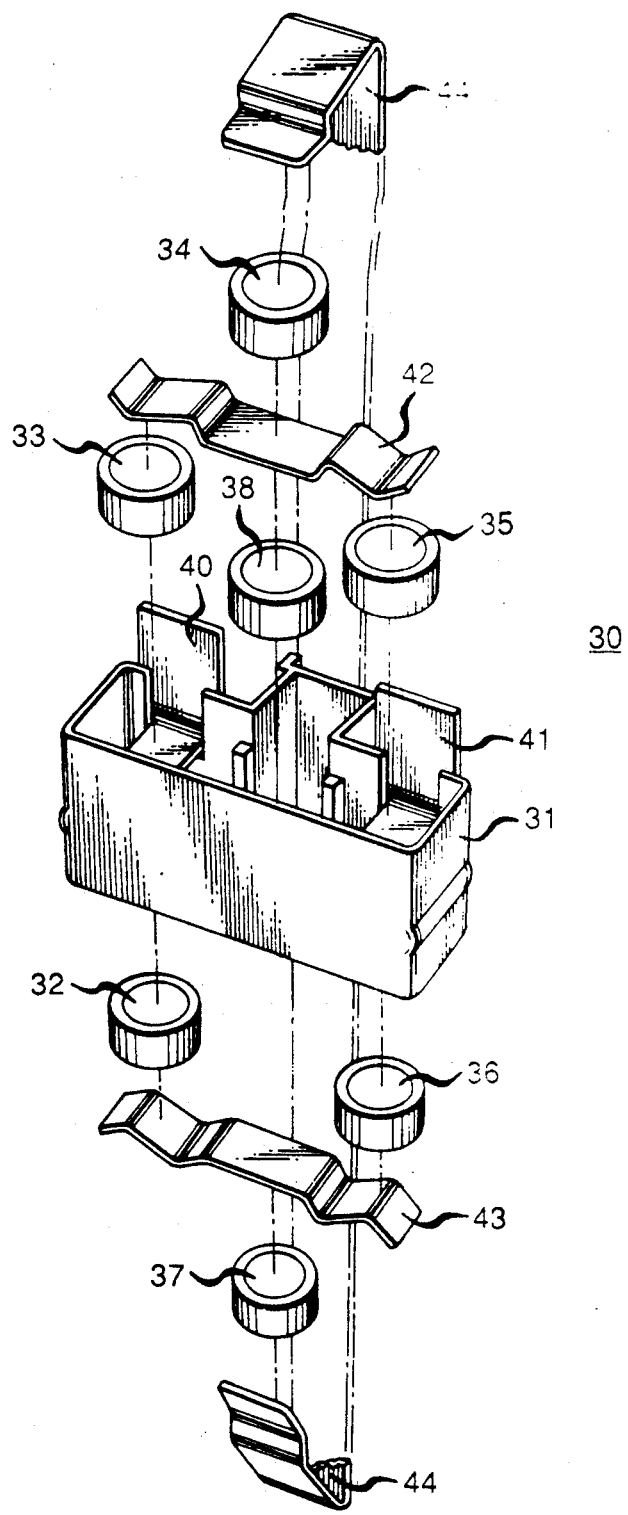
FIG. 3 is an exploded perspective view of a protector module in accordance with the same embodiment.

The U-shaped springs 21-23 are sized and positioned to receive a solid state protector module 30. This module, which is illustrated in more detail in FIG. 3, includes an insulating housing, 31, with six cylindrical steering diodes, 32-37, and a cylindrical solid state surge arrestor 38 positioned within the housing. Diodes 32 and 33 are mounted one above the other on one side of the housing with a portion of an L-shaped contact, 40, therebetween. Similarly, diodes 35 and 36 are mounted one above the other with a portion of an L-shaped contact 41 therebetween. Both L-shaped contacts 40 and 41 extend out the back of the housing 31 and upward past the top of the housing. At the center of the housing, surge arrestor 38 is sandwiched between steering diodes 34 and 37. The arrestor and diodes are held in place, in part, by a pair of wing-shaped contacts, 42 and 43. In particular, wing-shaped contact 42 has its ends extending over diodes 33 and 35, and its middle portion between arrestor 38 and diode 34. Similarly, wing-shaped contact 43 has its ends over diodes 32 and 36, and its middle portion between arrestor 38 and diode 37. A C-shaped contact, 44, has its ends positioned on diodes 34 and 37 and extends around the back of the housing. This contact holds the entire assembly together and also acts as the ground contact for the module.

The module, 30, is inserted in the contacts 21-23 so that the insulating housing 31 is secured within the projecting portions of the contacts. Further, the contact tabs 40 and 41 make electrical contact with the rear projecting portions of contacts 21 and 22, respectively. In addition, the C-shaped (ground) contact 44 makes electrical contact with the rear projecting portion of contact 23. It will be appreciated that the orientation of the module may be changed with an appropriate modification of the shape and position of the spring contacts.

The maintenance termination unit components, such as fuse, F, and the switches, 12 and 13, are provided on a printed circuit board, 50. The circuit board also includes contact pads 51 and 52 near one edge, along with an indentation 53 at that edge between the two pads. On the other side of the board (not shown) are two additional contact pads in the same position as pads 51 and 52.

The board is inserted between the rear protecting portions of contacts 21 and 22 and the projecting portions of contacts 24 and 25. The pads 51 and 52, therefore, make electrical contact with contacts 21 and 22, respectively, while the pads on the opposite surface of the board make electrical contact with contacts 24 and 25, respectively. Also, the indentation, 53, fits over the ground contact 44 of the module.

Once the board 50 and module 30 are inserted into their corresponding contacts, connection can be established by the spring pressure of the contacts, by soldering, or by mechanical attachment.

With the components in place, a plastic cover 54 is inserted over the structure. This cover includes tabs (not shown) on two sides, with holes, therein. These holes fit over tabs, 58 and 59, respectively, in the base member to secure the cover thereto.

As also shown in FIG. 2, a thermal overload mechanism can be included in the device. This mechanism takes the form of a horizontal member, 26, mechanically attached to the front projection of contact 23 and extending out in front of the front projections of contacts 21 and 22 but separated therefrom by solder pellets 27 and 28. If excessive heat is generated in the module, 30, the pellets would melt and the horizontal member would make contact with the contacts 21 and 22 to provide a direct ground connection for the T and R pins.

Figure 4:
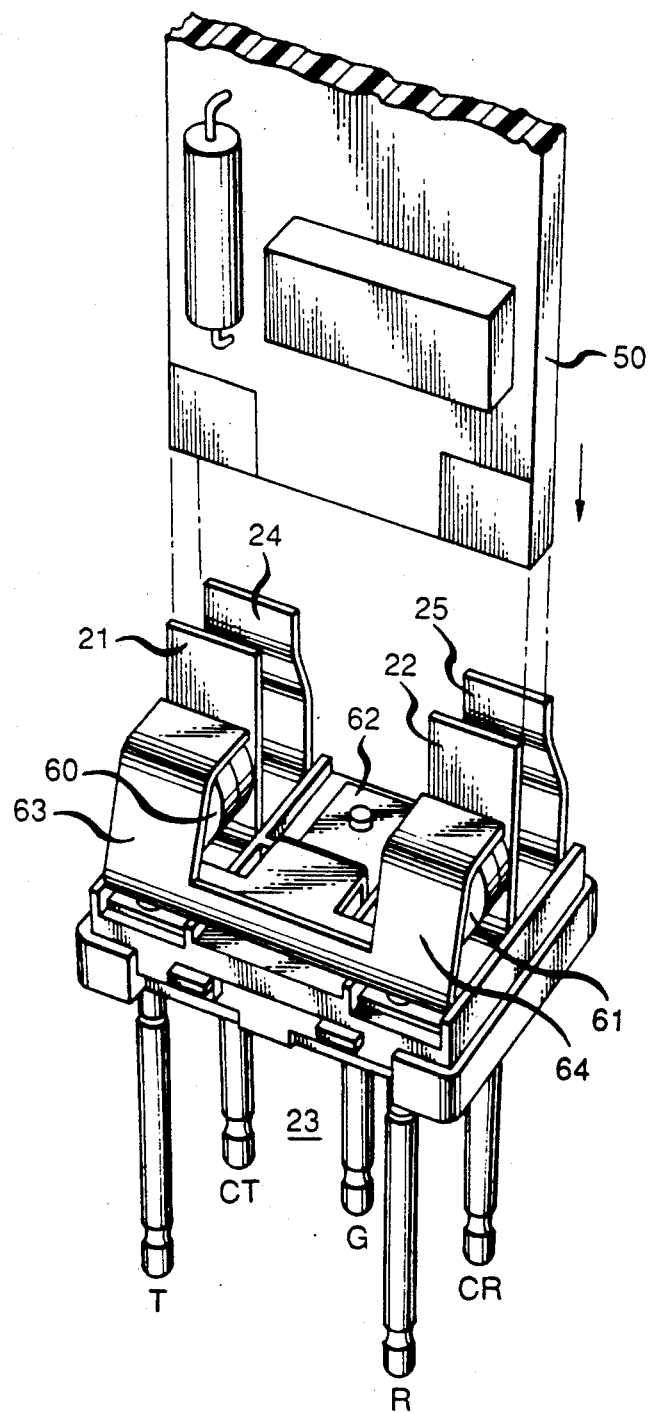
FIG. 4 is an exploded perspective view of a device in accordance with a further embodiment of the invention.

A further embodiment of the invention is illustrated in FIG. 4, where elements corresponding to those of FIG. 1 are similarly numbered. Here, the solid state protector module takes the form of cylindrical surge arrestors, 60 and 61, which are directly soldered to the rear projections of the spring contacts 21 and 22. It will be noted also, that there are no forward projections for contacts 21 and 22 in this embodiment. The ground contact 23 takes the form of a Y-shaped member with a projecting leg 62 which is fastened to the base 20. The two arms, 63 and 64, of the member are bent back to make physical and electrical contact with their associated surge arrestors, 60 and 61. Again, the circuit board, 50, including the MTU is inserted between contacts 21, 24 and 22, 25.

This embodiment provides thermal overload protection since excessive heat will melt the solder attaching the surge arrestors 60 and 61 to the contacts 21 and 22. When this occurs, the surge arrestors drop further down on the rear projections of those contacts, and the arms 63 and 64 of the ground contact will then make direct physical and electrical contact to the contacts 21 and 22 in an area vacated by the fallen surge arrestors. At this point, a direct contact exists between pins T and R and the ground pin G.

In a further embodiment, it would be possible to mount a surge protector module directly to the circuit board including the MTU prior to insertion of the board into the spring contacts on the base. Electrical contacts other than the spring contacts shown can be used to provide electrical contact to the protector module and-/or the MTU. Various additional modifications of the invention will become apparent to those skilled in the art. All such variations which basically rely on the teachings through which the invention has advanced the art are properly considered within the scope of the invention.

We claim:
1. A device comprising:
   a base member including a plurality of electrical contacts, each contact being electrically coupled to a corresponding pin projecting from the base;
   a circuit board including a maintenance termination unit mounted thereon and also including contact pads near an edge of said board; and
   a surge protector module in close proximity to said board and including contact portions thereon;
   the said board and said module being mounted to said electrical contacts to hold the board and module in place and to make electrical contact between the contact pads, the contact portions and the pins.
2. The device according to claim 1 wherein the protector module comprises a pair of solid state surge arrestors bonded directly to corresponding electrical contacts.
3. The device according to claim 2 wherein one of the electrical contacts is a ground contact in the form of a member with arms contacting corresponding surge arrestors.
4. The device according to claim 3 wherein the surge arrestors are soldered to respective electrical contacts so that excessive heat will cause the arrestors to drop down and cause the arms of the ground contact to directly contact the electrical contacts to which the arrestors are soldered.
5. The device according to claim 1 wherein the protector module comprises a solid state surge arrestor and a plurality of diodes within an insulating housing, and the housing is held in place by three electrical contacts, each electrically coupled to a different one of said pins.

6. The device according to claim 5 wherein the diodes are electrically contacted by a pair of projections above the insulating housing, and a ground contact is provided by a C-shaped conducting member which extends around one side of the housing.

7. The device according to claim 6 wherein the projections each make contact with an associated electrical contact coupled to one of the pins, and the C-shaped member makes contact with an electrical contact coupled to a ground pin.

8. The device according to claim 6 wherein the printed circuit board includes an indentation at the edge including the contact pads to accommodate the C-shaped member when the board is inserted into the electrical contacts so that each pad makes electrical contact with a corresponding electrical contact coupled to a pin other than the pins coupled to the protector module.

9. The device according to claim 8 wherein the three electrical contacts coupled to the module are U-shaped, and the two electrical contacts coupled to the pads on the printed circuit board are L-shaped and positioned on either side of the contact coupled to the ground pin.

10. The device according to claim 1 wherein the protector module is mounted to the printed circuit board.

11. The device according to claim 1 wherein the protector module is in close proximity to, but separate from, the printed circuit board.

12. The device according to claim 1 wherein a shorting contact coupled to a ground pin is provided in close proximity but spaced from two of the electrical contacts so that in the event excessive heat is generated, the shorting contacts will make physical and electrical contact with the electrical contact.

13. The device according to claim 1 further comprising a cover mounted to the base member so as to protect the protector module and maintenance termination unit.

14. The device according to claim 1 wherein the electrical contacts are spring contacts.

* * * * *